Patented Oct. 28, 1952

2,615,904

UNITED STATES PATENT OFFICE 2,615,904

PROCESS FOR THE PREPARATION OF 5,7-BISDEHYDROSTEROIDS

Johannes S. Buck, Glenmont, and Benjamin F. Tullar, East Greenbush, N. Y., assignors to Sterling Drug Inc., New York, N. Y., a corporation of Delaware No Drawing. Application February 23, 1951, Serial No. 212,520

5 Claims. (Cl. 260—397.2)

This invention relates to an improvement in the synthesis of 5.7-bisdehydrosteroids and comprises treating a 7-bromosteroid having a double bond in the 5,6-position with 1-phenoxypropylene 2,3-oxide, thereby producing a steroid having a second double bond in the 7,8-position. Any $\Delta^{5,6}$-7-bromosteroid can be used as the starting material, including derivatives of the sterol, bile acid, androstene and pregnene series. The invention is particularly adapted to the synthesis of 7-dehydrosterols which are useful as precursors of the vitamins D. By the term "sterol" we mean generally a compound of the cyclopentanoperhydrophenanthrene series having a hydroxy group or an esterified hydroxy group in the 3-position, and a hydrocarbon residue in the 17-position.

The conversion of 7-bromosterols or their esters to a 7-dehydrosterol by elimination of the elements of hydrogen bromide and production of a new double bond in the molecule between the 7- and 8-positions is not new. Heretofore this conversion has been effected by the use of basic dehydrohalogenating agents such as inorganic hydroxides and tertiary amines.

We have found an improved method of producing 7-dehydrosterols comprising treatment of a 7-bromosterol with 1-phenoxypropylene 2,3-oxide, a neutral substance. The 1-phenoxypropylene 2,3-oxide is converted to the corresponding bromohydrin, probably mainly 1-phenoxy-3-bromo-2-propanol. The mechanism by which the reaction proceeds is not known, but the resultant effect is the removal of the elements of hydrogen bromide from the sterol. 7-dehydrosterols or their esters are formed in good yield from the 7-bromo derivatives by our new method. A further advantage in the use of 1-phenoxy-propylene 2,3-oxide lies in the fact that the non-steroid byproducts, excess epoxide and the bromohydrin, are neutral liquids. Consequently, these byproducts can be readily removed from the reaction mixture by distillation at reduced pressure, or they can be allowed to remain in the reaction mixture to a greater or less extent to serve as part of the medium for crystallization of the steroidal products. This constitutes a simplification over the procedure necessary when a basic dehydrohalogenating agent is used. In the old method a salt is formed which is generally insoluble in organic solvents and must be separated from the steroidal product either by extraction with aqueous media or by use of particular organic solvent mixtures and special temperature conditions designed to keep the inorganic salt or amine salt in solution while the steroidal product remains undissolved, or vice versa. Avoidance of extraction with aqueous solutions is particularly desirable because of the loss of material due to formation of emulsions and inevitable mechanical inefficiencies.

The starting materials, 7-bromosterols or esters thereof, can be prepared by known methods, as by replacement of the hydroxy group of a 7-hydroxysterol (prepared according to Windaus et al. U. S. Patent 2,098,985) with bromine, or, preferably, by a Wohl-Ziegler bromination of a sterol ester having a double bond in the 5,6-position. A preferred specific method comprises bromination of a $\Delta^{5,6}$-sterol ester with N-bromo-succinimide in the presence of an organic peroxide or peracid as a catalyst.

The intermediate 7-bromosterol ester need not be purified or isolated. At least one equivalent and preferably an excess of 1-phenoxypropylene 2,3-oxide is added to the crude intermediate, and the resulting mixture is heated to a temperature between about 80° C. and 200° C. Lower temperatures can be used but the reaction then proceeds at a much slower rate. A preferred temperature is about 90–150° C. If a low boiling solvent is used in the bromination reaction it may be necessary to remove the majority of this solvent in order to attain the temperature necessary for dehydrobromination at a reasonable rate. It is preferable to add the 1-phenoxypropylene 2,3-oxide after completion of the bromination reaction; however, the process can be carried out only slightly less satisfactorily by adding the epoxide before the bromination reaction is conducted provided the temperature is maintained below the point where appreciable dehydrobromination occurs until bromination is complete and any excess N-bromosuccinimide is removed. In the dehydrobromination step, the epoxide can be used alone or it can be diluted with an inert solvent having a sufficiently high boiling point, i. e., between about 80° C. and 200° C., such as toluene or xylene.

Any 7-bromosterol or ester thereof, having a double bond in the 5,6-position, can be used as the starting material or intermediate in this process. The 7-dehydrosterols produced by the present invention are valuable as provitamins D. Specific 7-bromosterols which can be used include 7-bromocholesterol, 7-bromositosterol, 7-bromostigmasterol and 7-bromocampesterol, which by the new process are converted to 7-dehydrocholesterol (provitamin D₃), 7-dehydrositosterol, 7-dehydrostigmasterol and 7-dehydrocampesterol respectively.

A preferred aspect of the invention is the preparation of 7-dehydrocholesterol or an ester thereof by treatment of 7-bromocholesterol or an ester thereof with 1-phenoxypropylene 2,3-oxide. The 7-bromocholesterol is conveniently prepared in the form of its benzoate by a Wohl-Ziegler bromination of cholesteryl benzoate with N-bromosuccinimide in the presence of an organic peroxide or peracid catalyst. Crude 7-dehydrocholesteryl benzoate is obtained in essentially one operation from cholesteryl benzoate and is readily crystallized from acetone giving a material containing as much as 70% of 7-dehydrocholesteryl benzoate and representing a 50% yield of 7-dehydrocholesteryl benzoate based on the weight of the starting cholesteryl benzoate. Pure 7-dehydrocholesteryl benzoate can readily be obtained from the crude material of 60-70% purity by two recrystallizations from petroleum ether.

Any ester of a 7-bromosterol can be used in our new process, including the acetate, propionate, acid succinate and the like. In the case of 7-bromocholesterol, the benzoate is preferred, since it is more readily available due to the fact that bromination of cholesterol benzoate is effected in yields superior to those using most other esters.

Example 1

Cholesteryl benzoate (19.6 g., M. P. 145–147° C.) was dissolved in 200 cc. of petroleum ether (B. P. 65–66° C.) previously dried over anhydrous calcium sulfate by heating to a gentle reflux. To the boiling solution was added 8.5 g. of N-bromosuccinimide and 10 mg. of benzoyl peroxide. After a ten minute refluxing period, the reaction mixture was cooled to 10° C., and the precipitated succinimide was removed by filtration. To the filtrate was added 15 cc. of 1-phenoxypropylene 2,3-oxide, and the petroleum ether was distilled off in vacuo. Dry xylene (200 cc.) was added to the residual oil, and the resulting solution was boiled twenty minutes under reflux after which the xylene was removed by vacuum evaporation. The residue was dissolved in 100 cc. of acetone by boiling, cooled to 0° C. overnight, and the solid was collected by filtration. After washing with cold acetone and drying the product there was obtained 13.5 g. of nearly colorless crystalline product having the M. P. 120–125° C. and containing 69% of 7-dehydrocholesteryl benzoate as indicated by ultraviolet spectra.

The residual oil left after removal of the petroleum ether, containing crude 7-bromocholesterol and 1-phenoxypropylene 2,3-oxide, could be heated without the addition of xylene for two hours at 95° C. or thirty minutes at 120° C. with equally good results.

Example 2

1-phenoxypropylene 2,3-oxide (75 cc.) was added to the crude 7-bromocholesteryl benzoate prepared from 98 g. of cholesteryl benzoate according to the method described in Example 1, and the mixture was heated 2.5 hours at 95° C. and 10 mm. The solution was diluted with 500 cc. of acetone and cooled, giving 51 g. of crude 7-dehydrocholesteryl benzoate, M. P. 120–126° C., of approximately 60% purity. After two recrystallizations from 350 cc. of petroleum ether (B. P. 65–66° C.) there remained 21 g. of 7-dehydrocholesteryl benzoate having the following contents which were characteristic for pure 7-dehydrocholesteryl benzoate: M. P. 139.4–141.4° C.; optical rotation, $[\alpha]_n^{25} = -55.6°$ C.; the ultraviolet absorption spectrum showed maxima at 272 mμ ($E_m$ 13,310), 282 mμ ($E_m$ 13,620) and 294 mμ ($E_m$ 7,410).

It was found that a solvent containing three volumes of benzene to one of acetone was also efficient in recrystallization of the 7-dehydrocholesteryl benzoate.

Example 3

In another experiment identical with that described in Example 2 except that the 1-phenoxypropylene 2,3-oxide was added before the N-bromosuccinimide, there was obtained 45 g. of crude 7-dehydrocholesteryl benzoate which according to ultraviolet spectra was 45% pure.

According to the methods described in the preceding examples, 7-bromositosteryl benzoate can be converted to 7-dehydrositosteryl benzoate, 7-bromostigmasteryl benzoate can be converted to 7-dehydrostigmasteryl benzoate, and 7-bromocampesteryl benzoate can be converted to 7-dehydrocampesteryl benzoate.

We claim:

1. The process which comprises heating at a temperature between about 80° C. and 200° C. a 7-bromosteroid having a double bond in the 5,6-position with at least an equivalent amount of 1-phenoxypropylene 2,3-oxide.

2. The process which comprises heating at a temperature between about 80° C. and 200° C. at least an equivalent amount of 1-phenoxypropylene 2,3-oxide with a member of the class consisting of 7-bromocholesterol, 7-bromositosterol, 7-bromostigmasterol, 7-bromocampesterol, and carboxylic acid esters thereof.

3. The process which comprises heating at a temperature between about 80° C. and 200° C. a carboxylic acid ester of 7-bromocholesterol with at least an equivalent amount of 1-phenoxypropylene 2,3-oxide.

4. The process which comprises heating at a temperature between about 80° C. and 200° C. 7-bromocholesteryl benzoate with at least an equivalent amount of 1-phenoxypropylene 2,3-oxide.

5. The process for the preparation of 7-dehydrocholesterol benzoate which comprises heating cholesteryl benzoate with N-bromosuccinimide in the presence of a member of the class consisting of organic peroxides and peracids in an inert solvent, and heating at a temperature between about 80° C. and 200° C. the resulting crude 7-bromocholesteryl benzoate with at least an equivalent amount of 1-phenoxypropylene 2,3-oxide.

JOHANNES S. BUCK.
BENJAMIN F. TULLAR.

No references cited.